United States Patent [19]

Guironnet et al.

[11] Patent Number: 5,118,465
[45] Date of Patent: Jun. 2, 1992

[54] DEVICE FOR THE FITTING OF A BLOCKING SLEEVE OF A GUIDE TUBE IN A REMOVABLE CONNECTOR OF A FUEL ASSEMBLY OF A NUCLEAR REACTOR

[75] Inventors: Louis Guironnet, Lyons; Michel Bline, L'Arbresle, both of France

[73] Assignees: Framatome, Courbevoie; Cogema, Velizy Villacoublay, both of France

[21] Appl. No.: 409,198

[22] Filed: Sep. 19, 1989

[30] Foreign Application Priority Data

Sep. 19, 1988 [FR] France .................................. 88 12203

[51] Int. Cl.$^5$ .............................................. G21C 19/32
[52] U.S. Cl. ...................................... 376/261; 29/255; 294/93
[58] Field of Search .................. 376/261, 260, 446; 976/DIG. 68, DIG. 264, DIG. 65; 269/48.1; 294/93, 86.24, 906; 29/723, 906, 426.5, 234, 235, 255, 259, 262, 450, 451, 900

[56] References Cited

U.S. PATENT DOCUMENTS

| 791,497 | 6/1905 | Putnam | 294/93 |
|---|---|---|---|
| 2,641,831 | 6/1953 | Helton | 29/255 |
| 4,173,368 | 11/1979 | Haverbusch | 294/93 |
| 4,638,556 | 1/1987 | Shallenberger et al. | 376/261 |
| 4,639,998 | 2/1987 | Shallenberger et al. | 376/261 |
| 4,664,874 | 5/1987 | Shallenberger et al. | 376/261 |

FOREIGN PATENT DOCUMENTS

| 0182149 | 5/1986 | European Pat. Off. |
| 0187651 | 7/1986 | European Pat. Off. |
| 0223342 | 5/1987 | European Pat. Off. |

*Primary Examiner*—Daniel D. Wasil
*Attorney, Agent, or Firm*—Pollock, Vande Sande & Priddy

[57] ABSTRACT

The device comprises a pole (31) fastened to a handling and lifting means arranged above the pool in which the fuel assembly is placed underwater. The pole has at least one lower end part (32) or spindle, the diameter of which is less than the inside diameter of the blocking sleeve (25). This part (32) has a spring means (48) for retaining the blocking sleeve in the position engaged on the spindle, and a transversely arranged surface (38) for bearing on part of the sleeve (25), and a means (40) for the vertical movement of the pole (31).

13 Claims, 10 Drawing Sheets

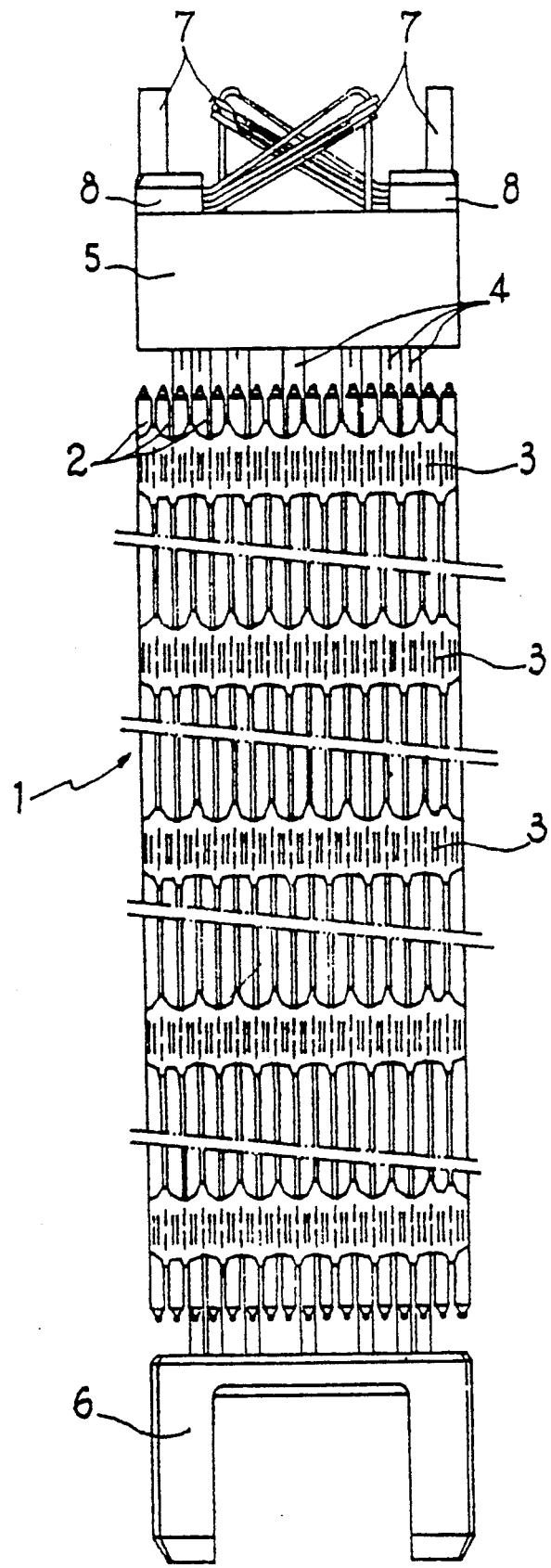
FIG_1

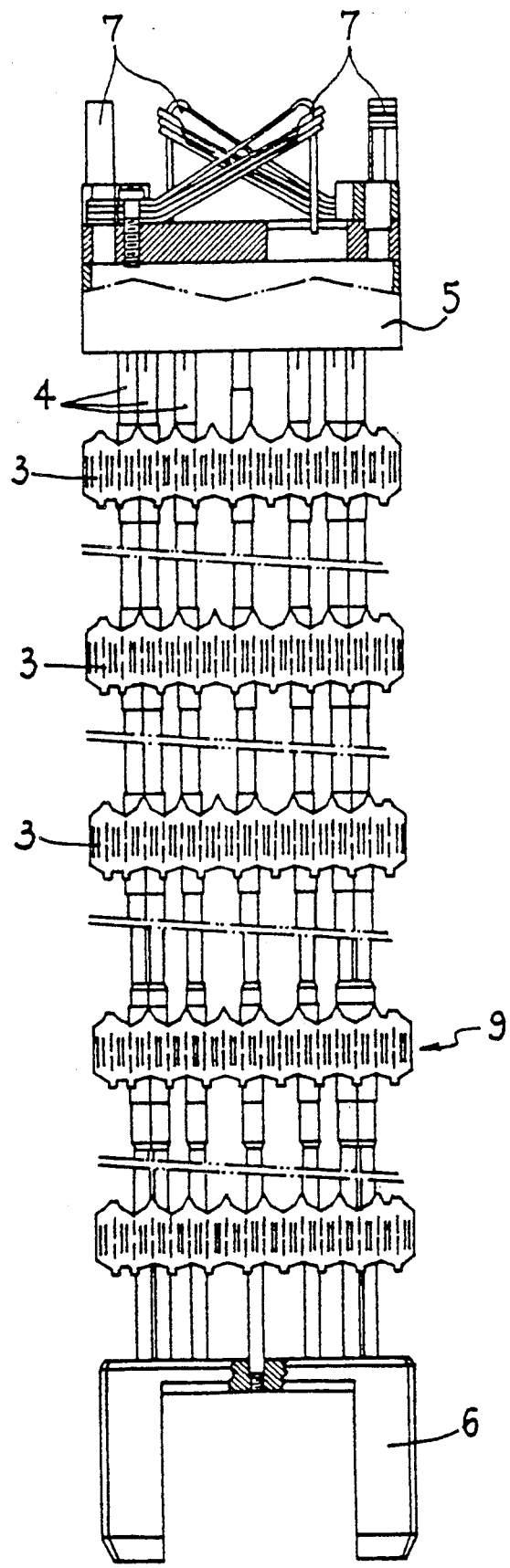
FIG_2

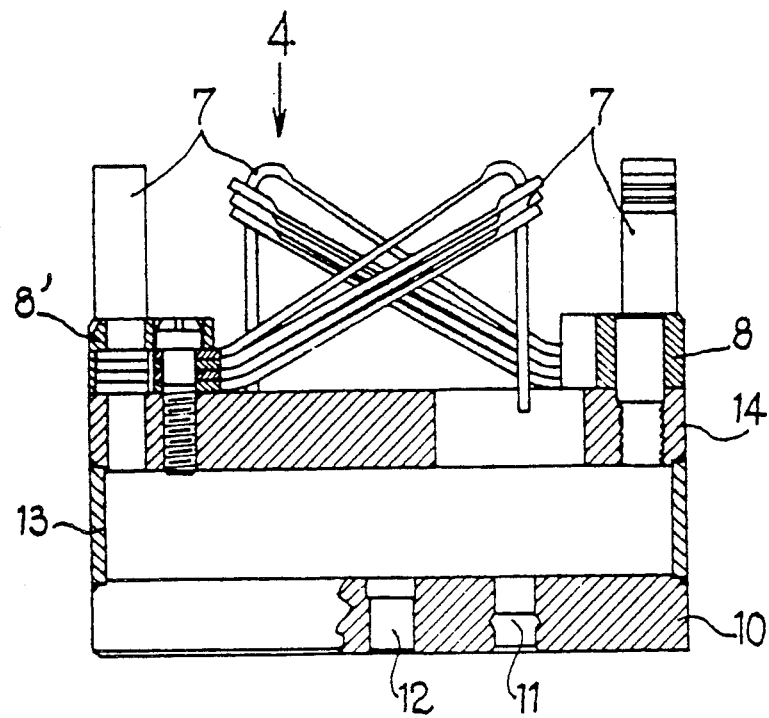
FIG_3
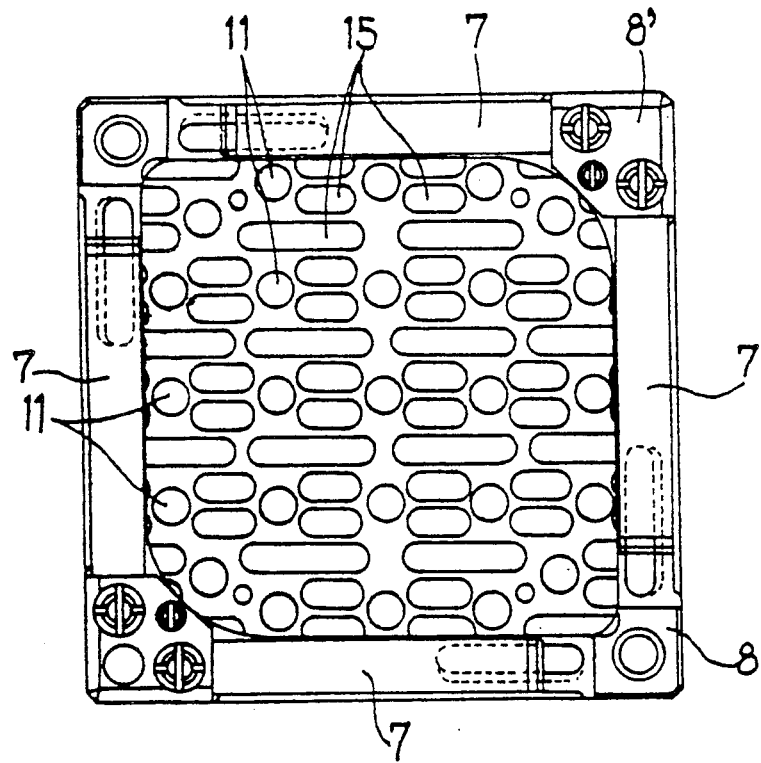
FIG_4

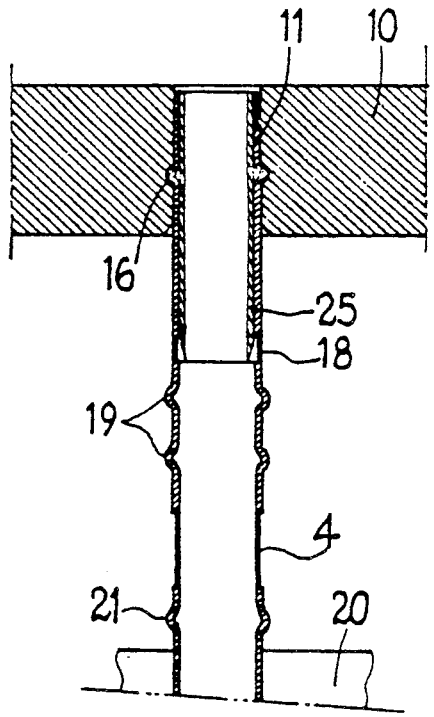
FIG._5
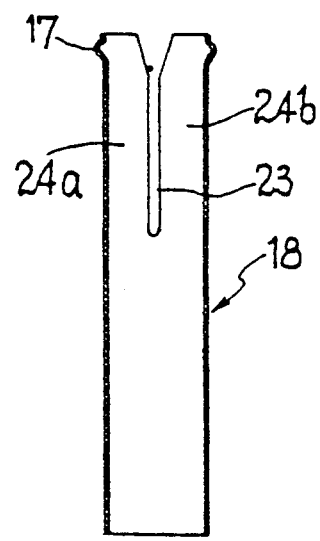
FIG._6
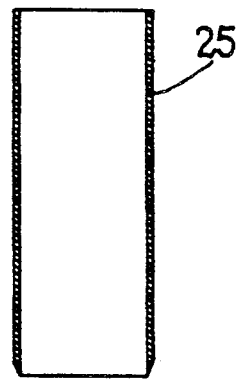
FIG._7A
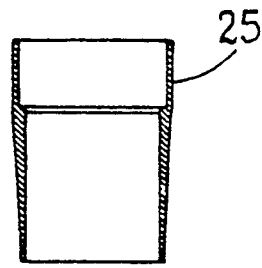
FIG._7B

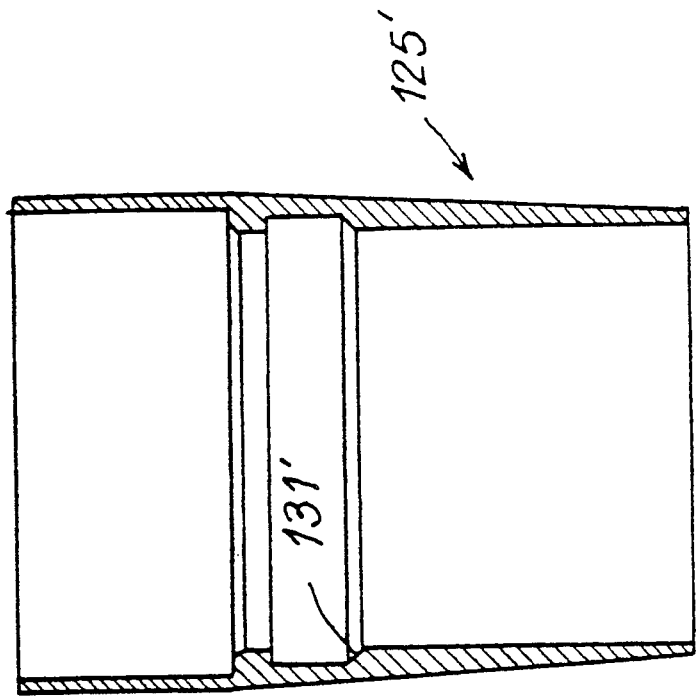
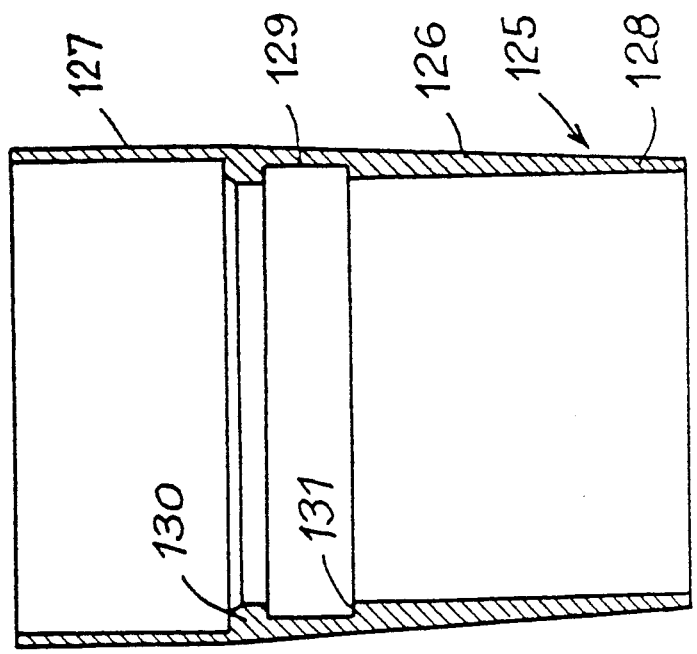

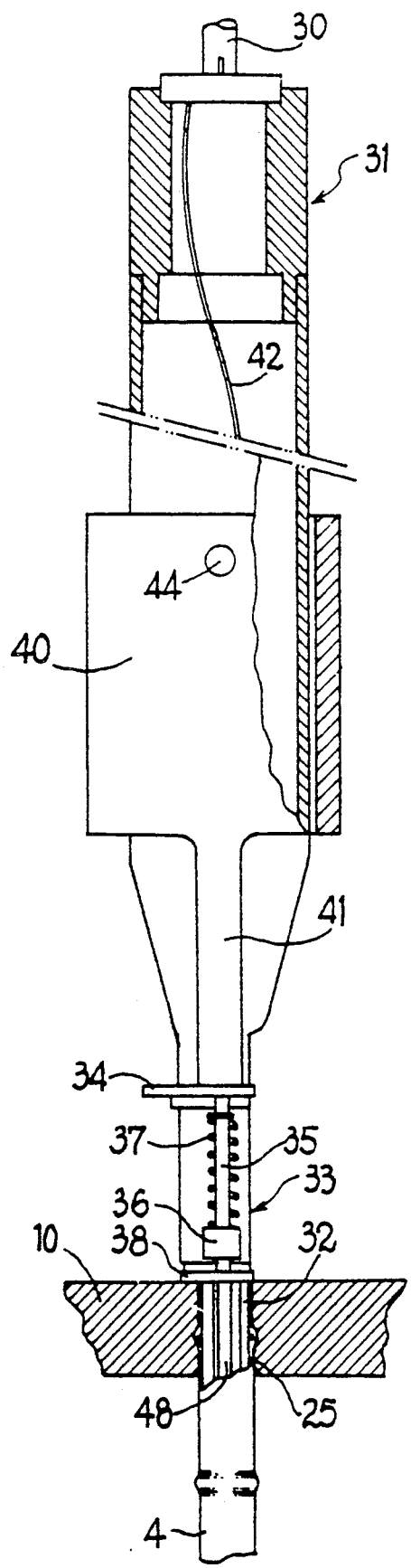
FIG_8

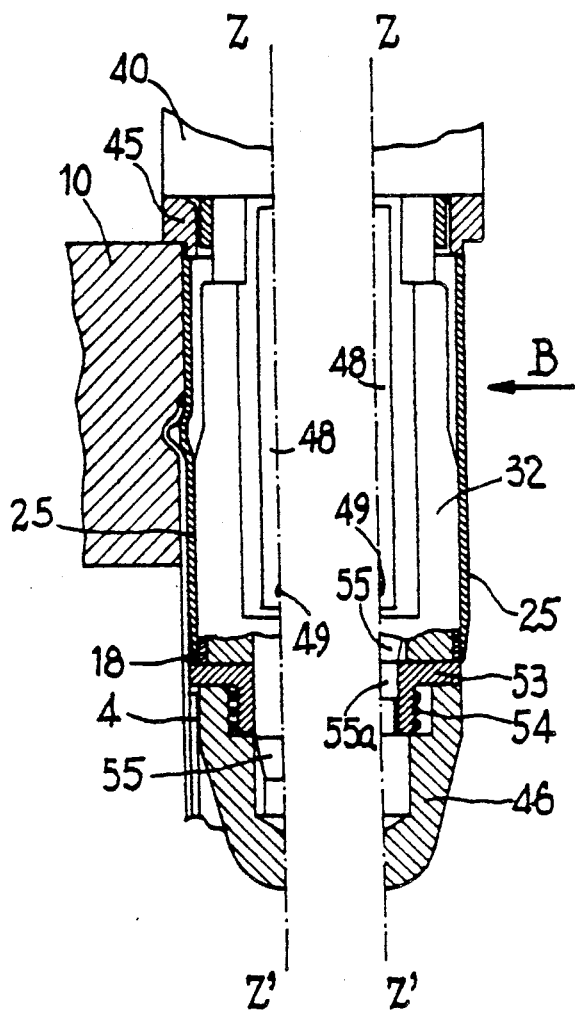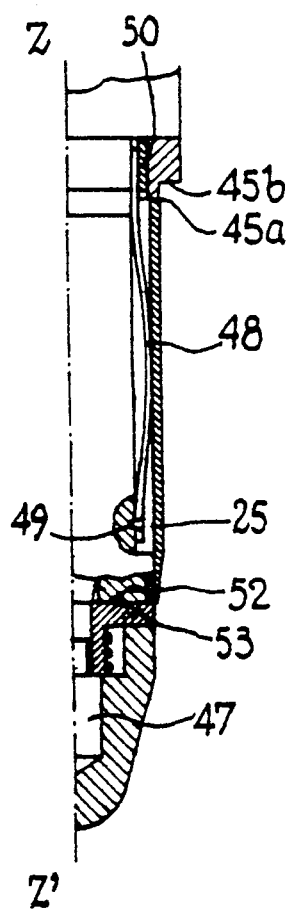
FIG_9C  FIG_9A  FIG_9B

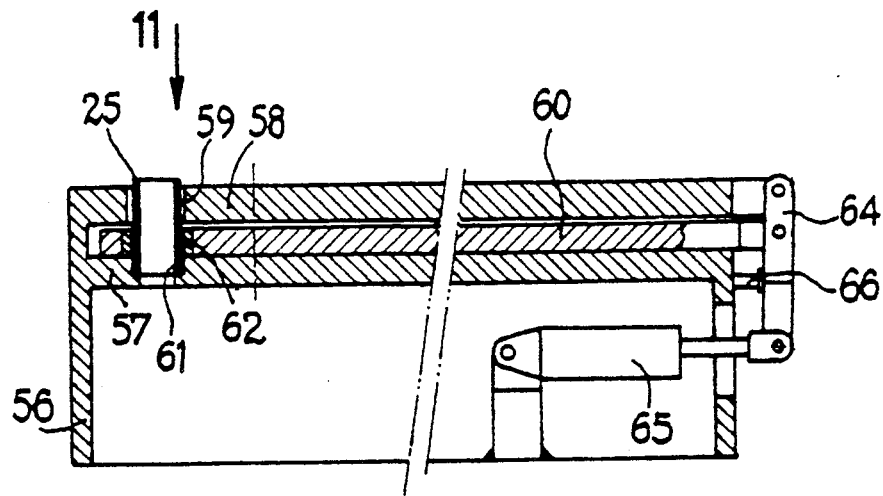
FIG_10
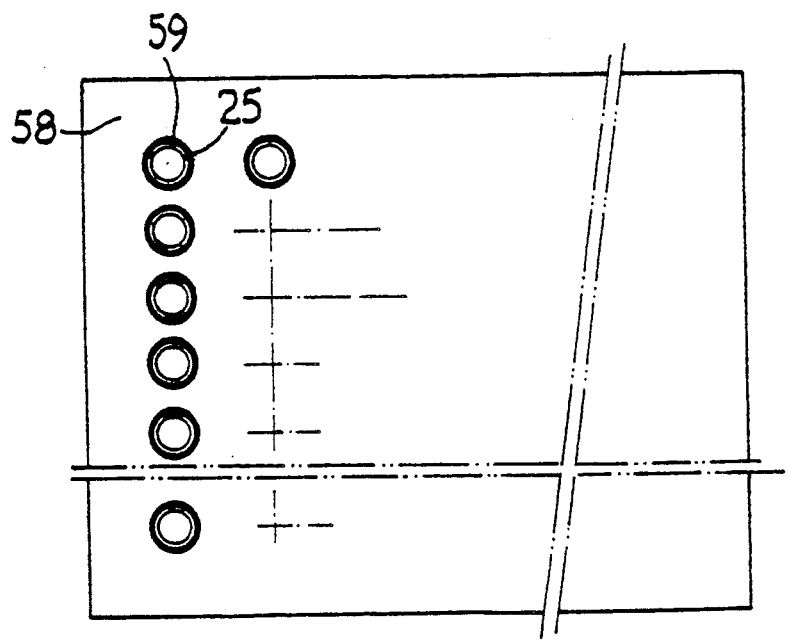
FIG_11

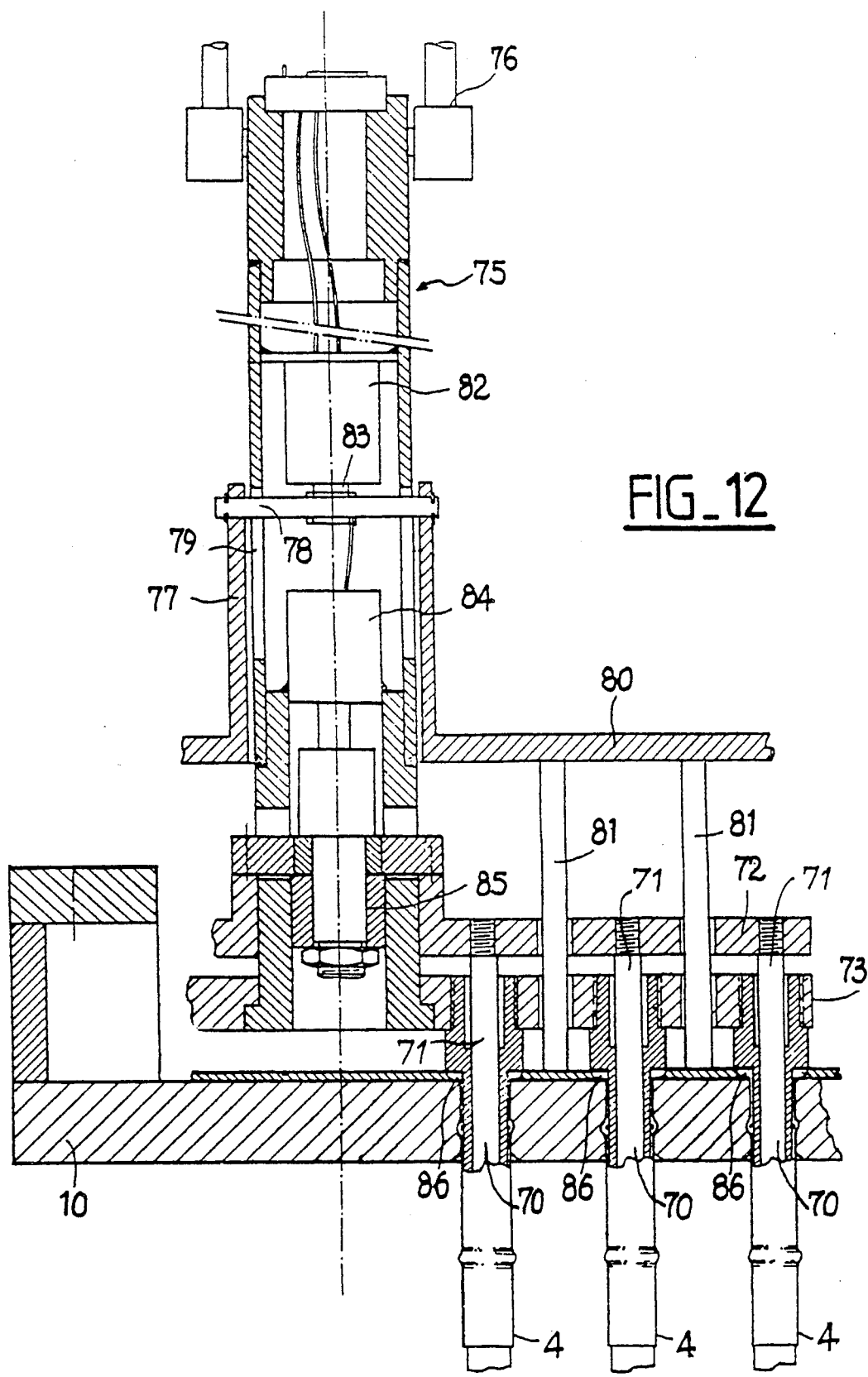
FIG_12

1

DEVICE FOR THE FITTING OF A BLOCKING SLEEVE OF A GUIDE TUBE IN A REMOVABLE CONNECTOR OF A FUEL ASSEMBLY OF A NUCLEAR REACTOR

FIELD OF THE INVENTION

The invention relates to a device for the fitting of a blocking sleeve of a guide tube in a removable connector of a fuel assembly of a nuclear reactor, especially of a pressured-water nuclear reactor.

BACKGROUND OF THE INVENTION

Water-cooled nuclear reactors, particularly pressurized-water nuclear reactors, have assemblies consisting of a bundle of fuel rods of great length which are arranged parallel to one another and held in a framework formed by guide tubes, spacers and two end connectors. The guide tubes are arranged in the longitudinal direction of the assembly and are connected to transverse spacers uniformly spaced over the length of the assembly.

The guide tubes are also connected, at each of their ends, to a connector forming an element for stiffening and closing the assembly.

The fuel rods of the assembly form a bundle, in which the rods are parallel to one another and, in the cross-sections of the assembly, arranged according to a regular network determined by the spacers. Some positions of the network are occupied by guide tube which are usually connected rigidly to the spacers.

The guide tubes are longer than the fuel rods and are arranged in the bundle so as to have a part projecting relatively to the bundle of fuel rods at each of their ends. The connectors are fastened to these projecting parts of the guide tubes, in order to ensure that the assembly is closed at each of its ends.

The fuel rods consist of sintered pellets of nuclear fuel material which are stacked inside a metal sheath isolating the pellets from the fluid surrounding the fuel assembly. If the sheath of a rod of a fuel assembly breaks, this rod has to be replaced very quickly in order to prevent radioactive product from leaking into the cooling fluid of the reactor. To gain access to the fuel rods and carry out their replacement, it is necessary to remove one of the connectors of the assembly, and this requires breaking the connections between the corresponding ends of the guide tubes and the connector.

The connectors have passage holes which reproduce the network of guide tubes and in each of which a guide tube is engaged and fastened.

In the most customary technique, the guide tubes are fastened permanently to the connectors, usually by welding, and it is not possible to remove the connector in order to carry out the replacement of a rod. It is therefore necessary, should the sheath of a rod break, to replace the defective fuel assembly by a new fuel assembly. The defective fuel assembly is dismantled, and the non-defective but highly irradiated fuel rods contained in this assembly are recovered and reinstalled in a new fuel-assembly framework. To carry out these operations and manipulations of contaminated elements, it is necessary to take precautions and work in complex and costly installations. The recovery of the non-spent fuel rods in the defective assemblies is therefore an operation involving a very high outlay.

New fuel assemblies having guide tubes, of which the connection to at least one of the end connectors is removable, have consequently been designed and developed.

The assembly is placed underwater in the vertical position, in a pool, such as a fuel-assembly storage pool, in which the replacement of the defective fuel rods is carried out. The guide tubes of the assembly are in vertical position, the assembly resting on the bottom of the pool by means of the lower connector. The upper connector is accessible, under a certain depth of water, from the top of the pool. Those parts of the guide tubes engaged in the upper connector of the assembly have a radially expandable part which, for example, can be attached to the end of the guide tube. This radially expandable part consists of a split bush having a radially projecting part which is intended to come to rest in a cavity of corresponding form machined inside the connector, in the passage hole of the guide tube. A blocking sleeve introduced into the guide tube ensures the radial expansion of the split bush and the retention of the guide tube.

When the removal of the upper connector and then the extraction and/or replacement of some rods of the assembly are carried out underwater in a pool, the upper connector has to be put back in place and fastened to the guide tubes of the assembly. For this purpose, it is necessary for a blocking sleeve to be introduced into the upper part of each of the guide tubes and fastened.

Devices used both for the fitting and for the extraction of the blocking sleeves are known. Such devices comprise a split tubular bush which terminates in a radially projecting bead and in which a stem terminating in a knob can be moved in order to actuate the split bush so as to move apart the sectors of the split bush. Such a device is not entirely reliable and there are some difficulties in using it.

No tool both simple and effective, making it possible to carry out the fitting of the blocking sleeves in the guide tubes of the removable assembly, has been known to date.

SUMMARY OF THE INVENTION

The object of the invention is, therefore, to provide a device for the fitting of a blocking sleeve of a guide tube in a removable connector of a fuel assembly of a water-cooled nuclear reactor, the assembly, consisting of a bundle of parallel fuel rods held in a framework formed by guide tubes, spacers and two end connectors, being placed underwater in a pool, the guide tubes in the vertical position being connected removably to the end connector located at the upper level of the assembly, by means of a radially deformable end part of the guide tube, which is seated in a hole passing through the upper connector and which has a radially projecting retention part and receives a blocking sleeve in its inner part, in order to ensure the radial expansion and retention of the guide tube via its retention part in an annular widening of the hole of the connector, this fitting device being of simple structure and capable of being put into effect simply, quickly and reliably.

To this end, the fitting device according to the invention comprises:

a pole fastened in the vertical position to a handling and lifting means arranged above the pool and having at least one lower end part or spindle, the diameter of which is less than the inside diameter of the blocking sleeve, means for retaining the blocking sleeve in the position engaged on the spindle and associated with the spindle, a bearing surface transverse relative to the axis of the spindle and capable of coming to bear on part of the blocking sleeve in the position engaged on the spindle, and means for vertical movement of the pole.

BRIEF DESCRIPTION OF THE DRAWINGS

In order that the invention may be more clearly understood, several embodiments of a fitting device according to the invention, used for the reinstallation of upper connectors of fuel assemblies of light-water nuclear reactors, will now be described by way of example, with reference to the accompanying drawings.

FIG. 1 is an elevation view of a fuel assembly of a pressurized-water nuclear reactor.

FIG. 2 is an elevation view of the framework of the assembly shown in FIG. 1.

FIG. 3 is an elevation view, partially in section, of the upper connector of the fuel assembly.

FIG. 4 is a top view, in the direction of arrow 4, of the upper connector shown in FIG. 3.

FIG. 5 is a view in axial section of the elements for fastening a guide tube in the upper connector of the assembly.

FIG. 6 is an elevation view of the end part of the guide tube ensuring its retention in the upper connector.

FIG. 7A is a sectional view of a blocking sleeve according to a first embodiment.

FIG. 7B is a sectional view of a blocking sleeve according to a second embodiment.

FIG. 7C is a sectional view of a blocking sleeve according to a third embodiment.

FIG. 7D is a sectional view of a blocking sleeve according to an alternative version of the third embodiment.

FIG. 8 is an elevation view in axial section of a fitting device according to the invention and according to a first embodiment.

FIGS. 9A, 9B and 9C are half-views in axial section of the spindle of a fitting device according to the invention.

FIG. 10 is a sectional view of a device with a supply of blocking tubes for the fitting device according to the invention.

FIG. 11 is a top plan view of FIG. 10 in the direction of arrow 11.

FIG. 12 is a sectional elevation view of a fitting device according to the invention and according to a second embodiment.

DETAILED DESCRIPTION

Figure 13:
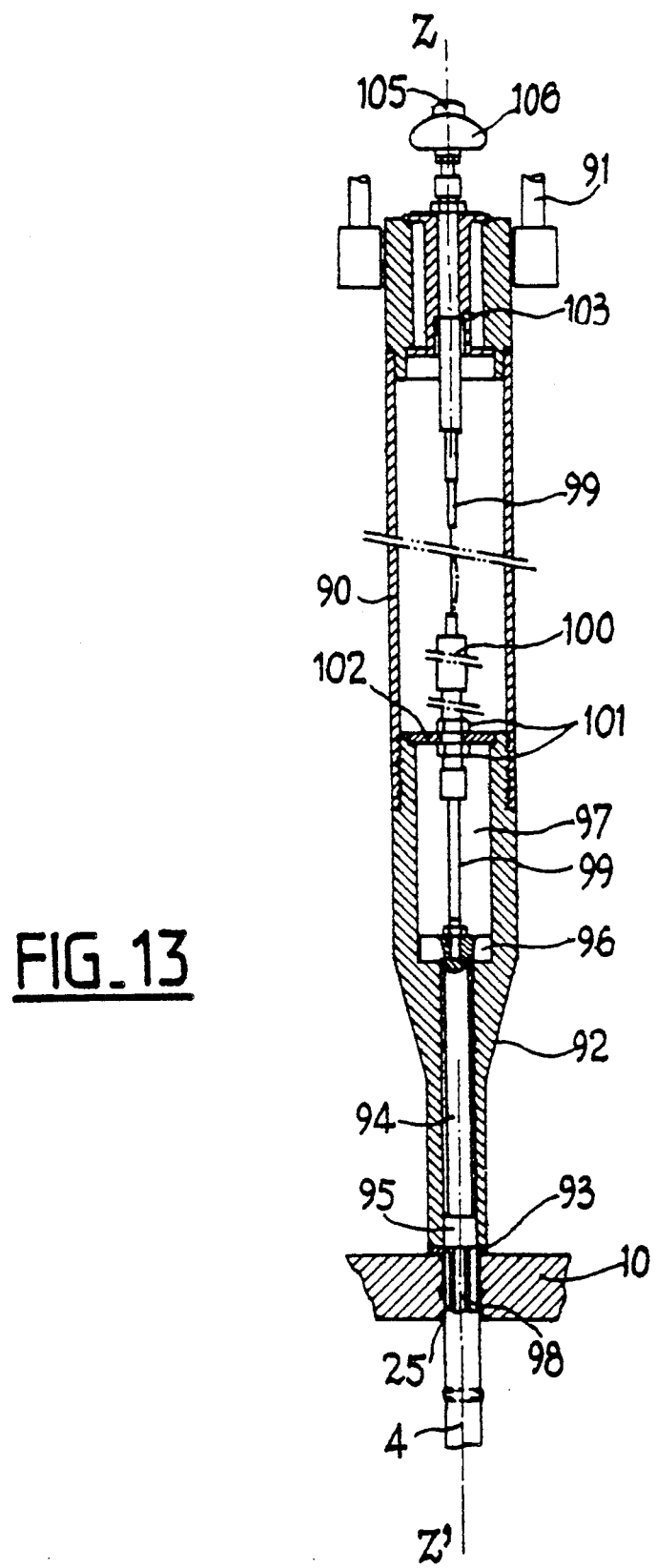
FIG. 13 is an elevation view in axial section of a fitting device according to the invention and according to a third embodiment.

FIG. 1 shows a fuel assembly 1 consisting of a bundle of parallel fuel rods 2 held by means of spacers 3 arranged at a certain spacing over the length of the rods 2. The spacers 3 consist of grids, the cells of which each receive a fuel rod. Some positions of the network of grids are occupied by guide tubes 4, the length of which is greater than the length of the fuel rods 2.

The guide tubes 4 are connected, at one of their ends, to a connector 5 forming the upper connector of the fuel assembly, and at their other end, to a second connector 6 forming the lower connector.

The assembly, in its operating position or storage position, is placed vertically, as shown in FIG. 1.

When the assembly is in the storage position underwater in a pool, the upper connector 5 is accessible from the top of the pool. This upper connector 5 carries leaf springs 7 ensuring that the assembly is held in the core of the reactor, the upper core plate coming to rest on the springs 7. The connector also has studs 8 projecting from its upper face.

FIG. 2 shows the framework 9 of the fuel assembly, comprising the guide tubes 4, spacers 3 and the end connectors 5 and 6. This framework 9 serves as a receptacle for the fuel rods 2 of the bundle, which can be introduced into or extracted from the framework when the upper connector 5 is removed. To carry out the replacement or extraction of rods, removable connections are provided between the end of the guide tubes 4 and the upper connector 5.

FIGS. 3 and 4 show an upper connector of a fuel assembly, comprising an adaptor plate 10, into which the guide tubes engage inside orifices 11 passing through this adaptor plate and accessible from the upper part of the fuel assembly. The centrally arranged instrumentation guide tube of the fuel assembly is received in an orifice 12 of special form. The upper connector of the assembly consists of the adaptor plate 10 and of a frame 14 which are connected to one another by means of a skirt 13 welded to the plate 10 and to the frame 14. The frame 14 carries the bosses 8 comprising the centering orifices and flanges 8' for holding the springs 7.

As can be seen in FIG. 4, the passage holes 11 making it possible to fasten the guide tubes 4 are arranged in specific positions corresponding to the positions of the twenty-four guide tubes of the assembly. Water passage holes 15 pass through the adaptor plate 10 of the connector between the passage orifices 11 of the guide tubes.

As can be seen in FIG. 5, the passage orifices 11 of the adaptor plate 10 receiving the guide tubes 4 have an annular widening 16, in which a toroidal projection 17 located at the upper end of the guide tube 4 comes to rest.

In the embodiment illustrated in FIGS. 5 and 6, the upper part 18 of the guide tube 4 consists of a sleeve attached to the upper end of this guide tube and fastened by means of deformed annular zones 19 of the sleeve 18 and of the guide tube 4.

A sleeve 21 for passing through the upper spacer grid 20 is likewise fastened to the guide tube as a result of the annular deformation of the lateral wall of the guide tube and of the sleeve.

The sleeve 18 has two diametrically opposite slots 23 delimiting two cylindrical sectors 24a and 24b in the wall of the sleeve 18. The two cylindrical sectors 24a and 24b having the annular projection 17 in the vicinity of their ends allow some diametral expansion or diametral contraction of the end of the sleeve 18.

To install the guide tube, the sleeve 18 is introduced into a passage orifice 11 of the adaptor plate 10, so as to bring the annular projections 17 into coincidence with the widened part 16 of the orifice. This introduction can be carried out easily as a result of the diametral contraction of the elastic cylindrical sectors 24a and 24b.

The guide tube is blocked in position by introducing a blocking sleeve 25 into the sleeve 18 via the upper face of the adaptor plate 10. The blocking sleeve 25 may, for example, be cylindrical, as shown in FIG. 7A, or slightly frustoconical, as shown in FIG. 7B.

FIGS. 7C and 7D show a blocking sleeve 125 of cylindrical frustoconical outer form, which makes it possible to block a guide tube in position reliably by means of simple operations. As discussed hereinbelow, the invention is likewise put into practice advantageously, when a blocking sleeve 125, such as that shown in FIG. 7C or FIG. 7D, is used.

The blocking sleeve 125 comprises a one-piece tubular wall 126, the outer surface of which has a cylindrical upper part and a frustoconical lower part which are connected by means of the large base of the frustoconical part.

The thickness of the wall 126 is variable over the height of this wall. The upper part 127 of the wall forms a collar of small thickness. The inner bore of the lower part 128 of the blocking sleeve is cylindrical, with the result that the wall has a thickness decreasing from the top downwards in this lower part 128.

The part 128 of the wall has an annular groove 129 in the vicinity of its upper end, in its part of large thickness.

The collar 127 is separated from the frustoconical part 128 by means of a rim 130 projecting radially towards the inside of the sleeve. The groove 129 is delimited on the opposite side to the rim 130, i.e. downwards, by a shoulder 131.

The groove 129 can be used for putting the blocking sleeve 125 in place in a guide tube by introducing a gripping tool into the groove 129, as will be explained later. An axial push can be exerted on the sleeve 125 by means of the shoulder 131, in order to ensure the blocking of the guide tube which is kept spaced apart by the frustoconical part 128 engaged in the guide tube.

The collar 127 is then located in a part of the bore of the connector of the assembly which is not occupied by the guide tube. One or more radial indentations are machined in this part of the bore of the connector. After the blocking of the guide tube, the collar 127 is pushed into the radial indentations of the bore of the connector, and it ensures that the blocking sleeve is fastened in these.

FIG. 7D shows an alternative embodiment of the blocking sleeve of FIG. 7C. The sleeve 125' is identical to the sleeve 125, except for the fact that it has a frustoconical shoulder 131' instead of the plane shoulder 131 used during the installation of the blocking sleeve in the guide tube.

This operation of fitting a blocking sleeve of a guide tube can be carried out underwater in a pool, where the fuel assembly is stored.

According to the invention, for fitting the blocking sleeves of a fuel assembly underwater, a device, such as that shown in FIG. 8, is suspended by a grab handle 30 on a handling and lifting means arranged above the pool.

The device mainly comprises a tubular pole 31, the length of which can be of the order of four meters. The pole 31 has a lower part consisting of a tubular piece or spindle 32, which will be described in more detail by reference with FIGS. 9A, 9B and 9C. The spindle 32 has an outside diameter slightly less than the inside diameter of the blocking sleeve 25 of the tube 4, in the adaptor plate 10 of the upper connector of the assembly, during reinstallation.

A unit 33 for ejecting the blocking sleeves is arranged around the end part of the pole 31 to which the spindle 32 is fastened. This unit 33 comprises an upper plate 34 mounted slidably on the end of the pole 31 and forming an ejecting pusher, to which is fastened a set of stems 35 mounted slidably in a guide piece 36 fixed to the lower part of the pole and returned to the high position by springs 37 bearing on the plate, 36.

That end of the stems 35 which is opposite the plate 34 is fastened to an ejector plate 38 mounted slidably on the outer surface of the spindle 32.

If the device according to the invention is used for carrying out both the fitting and the extraction of the blocking sleeves, as will be explained later, the downward actuation of the pusher 34 makes it possible to eject a blocking sleeve which has just been extracted from a guide tube and which has remained strung on the spindle 32 of the pole after the latter has been lifted.

Furthermore, the device 33 makes it possible to transmit to the blocking sleeve the axial push necessary for introducing it into the guide tube and to find a bearing on the connector in order to carry out the extraction of the spindle of the blocking sleeve in place in the guide tube.

The pole 31 is mounted slidably in the axial direction inside a tubular body 40 extended downwards by struts 41 bearing on the pusher 34 of the ejection device 33.

A hydraulic jack fed via a pipeline 42 is connected both to the body 40, by means of a horizontal axle 44 mounted axially movably in apertures provided in the wall of the pole 31, and to the pole 31. For example, the rod of the jack will be connected to the axle 44 and its body fastened to the pole 31.

Feeding the jack makes it possible to move the pole 31 upwards relative to the body 40, from its position shown in FIG. 8, the body 40 bearing on the upper face of the adaptor plate 10 by means of the struts 41 and the device 33.

The lower part of the fitting device consisting of the spindle 32 will now be described with reference to FIGS. 9A, 9B and 9C.

In FIG. 9A, the spindle is shown with a blocking sleeve 25 engaged on its outer surface, before the sleeve 25 is introduced into a guide tube.

FIG. 9B is a view in the direction of arrow B of FIG. 9A.

In FIG. 9C, the spindle is shown after a blocking sleeve has been installed inside a guide tube.

Furthermore, in FIGS. 9A, 9B and 9C, the device illustrated has no ejection unit similar to the unit 33 illustrated in FIG. 8. The tubular body 40, inside which the pole 31 and the spindle 32 are mounted slidably in the axial direction, is fixed in its lower part to an annular piece 45 forming a shim comprising a first bearing surface 45a, intended to come in contact with the upper end of the blocking sleeve 25, and a second bearing surface 45b intended to come in contact with the upper phase of the adaptor plate 10 of the connector of the assembly, during the fitting of the blocking sleeve 25 (FIG. 9C).

A spindle 32 comprises a tubular body connected, in its lower part, to a nose-shaped end piece 46 facilitating the introduction of the spindle into the passage hole of the adaptor plate and into the upper part 18 of the guide tube, during the installation of a blocking sleeve.

The running part of the spindle 32 has a diameter less than the inside diameter of the blocking sleeve 25.

As can be seen from FIGS. 9A, 9B, and 9C taken as a whole, three leaf springs 48 are fastened to the outer surface of the running part of spindle 32 in its longitudinal direction. The springs 48 are fastened to the peripheral surface of the spindle 32 in positions located at 120° relative to one another about the axis ZZ' of the spindle.

Each of the leaf springs 48 is fastened in a notch machined in the peripheral surface of the spindle 32, and has a lower part is fastened to the spindle 32 by means of a welding spot 49. The upper part of each of the leaves 48 is fastened against the surface of the spindle 32 by means of a ring 50 whose position along the axis of the spindle is adjustable. As can be seen in FIG. 9B, the leaf springs 48 are curved form and their convex part faces outwards. The curvature of the leaves 48 can be adjusted by shifting the ring 50.

This curvature will be selected in such a way that the cylinder of axis ZZ' enveloping the three leaves 48 has a diameter slightly greater than the inside diameter of the blocking sleeve 25.

Thus, when a sleeve 25 is engaged on the spindle 32, up to the moment when its upper end comes in contact with the bearing surface 45a of the annular piece 45, a slight bending of the leaf springs 48 is generated, and as a result of elasticity these ensure centering and some retention of the sleeve on the spindle 32.

Moreover, the lower part of the spindle illustrated in FIGS. 9A, 9B and 9C has radial orifices 52 communicating with the central bore 47 of the spindle and opening onto its outer surface.

A retention claw 53 is mounted in each of the radial orifices 52. The three claws 53 are held in a position retracted inside the corresponding radial orifice 52 by means of an elastic device consisting of springs 54.

An actuating rod 55 is mounted slidably inside the bore 47 and, at its lower end, has a part 55a, the diameter of which is less than the diameter of the running part of the rod 55.

The rod 55 can be moved between a position in which its lower part 55a is in contact with the inner surface of the retention claws 53, and a lowered position in which the running part of the rod 55 is in contact with this inner part of the claws 53.

In the first position of the actuating rod, the claws 53 are in the position retracted inside the orifices 52, their outer end being located within the inner contour of the sleeve 25.

On the contrary, in the second position of the rod 55, the claws 53 are extracted and their outer end comes under the blocking sleeve 25 engaged on the spindle 32 and up against the bearing surface 45a.

The actuating rod 55 can be actuated from the upper part of the pole located at the upper level of the pool.

This unit comprising the extraction claws and their actuating means is used mainly for extracting the blocking sleeves, as is explained in a copending patent application (Ser. No. 07/409200) filed by applicants on the same day as the present application.

Where a device for fitting the blocking sleeves is concerned, the retention claws are not necessary, and the blocking sleeve 25 can be retained in its illustrated position solely by means of the springs 48.

However, a multi-purpose tool ensuring both the fitting and the extraction of the blocking sleeves can be designed. In this case, the retention claws 53 can serve for retaining the sleeve, at the same time as the springs 48 or independently of these.

As regards a blocking sleeve 125 or 125', such as that shown in FIG. 7C or FIG. 7D, the design of the spindle 32 and the position of the annular piece 45 are such that the claws 53 assume their place at the level of the groove 129 when the spindle is engaged into the blocking sleeve, the claws 33 being in the retracted position. In this case, the sleeve can be retained solely by the claws 53, these claws being extracted and engaged in the gripping groove 129.

To install a blocking sleeve 25 in a guide tube 4, the end 18 of which is introduced into a bore in an adaptor plate 10 of an upper connector of a fuel assembly, by the use of a device such as that shown in FIG. 8 or FIGS. 9A to 9C, the blocking sleeve 25 is engaged on the spindle 32, up to the moment when the upper end of the sleeve comes up against the bearing surface 45a of the shim 45.

As regards a multi-purpose device making it possible to fit and extract sleeves by means of retention claws, these retention claws must be in their retracted position in this first phase, which can be carried out above the pool, the pole being raised by means of the winch of the travelling crane ensuring its suspension, in such a way that its lower part is accessible to an operator.

The pole is subsequently lowered into the pool to the level of the upper connector of the assembly which is to be reinstalled. The position of the pole and of the spindle 32 is then set and checked by means of a video camera, so as to align the axis ZZ' of the spindle with the axis of the guide tube 4 to be fastened.

The blocking sleeve 25 is introduced into the bore of the adaptor plate 10 and into the upper part 18 of the guide tube and is then pushed and put in place by means of a bearing piece which can be formed by the ejector plate 38 (FIG. 8) or by the shim 45 (FIG. 9C).

Where a blocking sleeve 125 or 125', such as that shown in FIGS. 7C and 7D, is concerned, the push will advantageously be obtained by means of the claws 53 of the spindle 32 which are in the extracted position and which come to bear on the shoulder 131 or 131' of the groove 129 of the sleeve, a push being exerted on the pole.

If the push is exerted by means of an ejection unit 33, the push plate can likewise come in contact with the upper end of the locking sleeve via an adjusting ring, such as the ring 45.

As can be seen in FIG. 9C, the bearing surface 45b of the adjusting ring 45 comes in contact with the upper surface of the adaptor plate 10, thus determining the stopping of the lowering movement of the pole, in order to carry out the fitting of the sleeve 25 which is thus perfectly in place in the guide tube.

The adjusting ring 45 thus makes it possible to transmit the push to the blocking sleeve 25 and ensure that it is installed exactly in the axial direction inside the guide tube.

It should be noted that the adjusting ring and the ejection unit are fastened to the body 40 in which the pole is mounted slidably. During the installation of the sleeve, the pole and the tubular body 40 are blocked in axial position relative to one another, and the axial push of the pole can be transmitted to the blocking sleeve in order to insert it into the guide tube.

After the installation of the sleeve, the jack is fed, thereby causing the pole to rise, the tubular body 40 bearing on the upper connector of the assembly. The movement of the pole is sufficient to extract the spindle 32 completely from the blocking sleeve which is held in the bore of the adaptor plate and in the guide tube by means of the ring 45. Extraction is achieved without difficulty, insofar as the elastic leaf springs 48 exert only a limited force on the inner wall of the blocking sleeve.

It should be noted that, when a multi-purpose device comprising both retention claws and springs is used, the retention claws must be in the retracted position during the rising of the pole.

The adjusting ring 45, which, if appropriate, can be placed under the ejector plate of the unit 33, in addition to performing its function during the installation of the sleeve, ensures the retention of this sleeve during the raising of the pole. Furthermore, where a multi-purpose fitting and extraction device is concerned, the adjusting ring 45 ensures the setting of the axial position of the sleeve on the spindle 32, in such a way that the retention claws 53 can come just underneath the lower end of the sleeve 25 or inside the groove 129 of the sleeve 125 or 125' during their extraction.

The devices described above use a pole mounted slidably inside a tubular body allowing a limited movement of the pole in order to carry out the extraction of the spindle after the installation of the blocking sleeve. If elastic springs are used to ensure the retention of the blocking sleeve on the spindle, it is possible to avoid the use of such a sliding mounting of the pole. Such a simplified device will comprise a simple one-piece pole carrying, at its lower end, the spindle 32 equipped with leaf springs and an adjusting ring, similar to the ring 45, forming a bearing surface for the upper end of the blocking sleeve and a surface for bearing on the upper connector of the assembly, in order to ensure correct positioning of the blocking sleeve. This positioning is ensured simply by a push by means of the pole, up to the moment when the adjusting ring comes to bear on the connector of the assembly.

The pole is subsequently raised, thus obtaining the extraction of the spindle 32 from the blocking sleeve, without movement of this sleeve, although there is no component retaining it. In fact, the blocking sleeve is introduced into the guide tube by force and is held there firmly by means of the radial elastic forces exerted by the guide tube. Conversely, elastic springs 48 exert only limited forces on the inner wall of the blocking sleeve, with the result that the spindle can be extracted without moving the sleeve.

For each of the fuel assemblies whose upper connector is to be reinstalled, it is necessary to carry out the fitting of twenty-four blocking sleeves, each inserted in one of the twenty-four guide tubes of the assembly.

If the pole has to be raised after each of the operations of fitting a sleeve in order to equip the spindle with a new blocking sleeve, the operations of reinstalling an assembly require a large number of individual steps and a very long time.

The device for the supply of blocking sleeves, which is illustrated in FIGS. 10 and 11, makes it possible to omit many steps. This device can be arranged in the pool in the vicinity of the assembly to be reinstalled. The supply device comprises a parallelepipedic structure 56 whose upper part is closed by means of a plate 57, itself fixed to a second plate 58 placed parallel to and in line with the plate 57 and fixed rigidly to the latter.

The plate 58 is pierced with passage orifices 59, the diameter of which is substantially larger than the outside diameter of the blocking sleeves 25.

The plate 57 is pierced with a set of blind holes 61, each arranged in vertical alignment with a hole 59 in the plate 58.

A third plate 60 is mounted freely between the plates 57 and 58 and has a network of passage holes similar to the network of holes 59 in the plate 58. Fastened in each of the holes 62 in the plate 60 is a rubber sleeve, the inside diameter of which is very slightly larger than the diameter of the blocking sleeve 25.

A link 64 is fastened in an articulated manner along one of the edges of the plate 58 and along the corresponding edge of the plate 60 in the region of forks machined in these plates. Furthermore, the link 64, at its end opposite the plates 58 and 60, is articulated on the rod of a jack 65 fastened to the structure 56. Between its two articulated end parts, the link bears on a stop 66 fixed to the structure 56.

The jack 65 makes it possible to move the plate 60 in parallel with the plates 57 and 58 by a lever effect by means of the link 64.

During the filling of the device for the supply of blocking sleeves 25, these sleeves are arranged in the mutually coinciding orifices 59 and 62 and come to rest on the bottom of the corresponding blind hole 61.

When all the positions of the supply device have been filled with blocking sleeves, these sleeves are clamped by feeding the jack 65, thereby causing a shift of the plate 60 and clamping of the sleeves 25 in the orifices 59 and 61 by means of the rubber sleeves lining the orifices 62 and preventing the sleeves from being damaged during their clamping.

The supply device can be positioned at the desired location together with its set of sleeves 25.

The pressure of the jack 65 is relaxed, with the result that the sleeve 25 is free in the orifices 59, 61 and 62, the diameter of which is substantially larger than the diameter of the sleeve 25.

A sleeve 25 can be extracted by the fitting device by introducing the spindle 32 into the sleeve resting on the plate 57 of the structure 56. A sleeve 25 is then held on the spindle 32 by means of the springs 48. The pole can be lifted and the sleeve 25 transported towards the guide tube to be blocked. The operation can be carried out for each of the guide tubes to be fastened; the capacity of the supply device is sufficient to ensure the provision of blocking sleeves for the guide tubes of several assemblies.

FIG. 12 illustrates a device making it possible to carry out in a single operation the fitting of the blocking sleeves of all the guide tubes of a fuel assembly.

The extraction device, called a multi-spindle device, comprises a plurality of spindles 70, each of which is formed in the same way as the spindle 32 shown in FIGS. 9A, 9B and 9C.

However, these spindles 70 can have only leaf springs 48 or only retention claws 53 in order to ensure the retention of the blocking sleeves on the spindles 70, before they are fitted in the guide tubes of the assembly.

If the spindles 70 have retention claws, these can be put in the extraction position as a result of the downward movement of stems 71 whose upper parts are fastened to a plate 72 allowing the simultaneous movement of all the stems 71.

The spindles 70 are themselves fastened to a plate 73 fixed rigidly to the lower end of a pole 75 having a grab handle 76, making it possible to connect it to the winch of a handling crane of the pool in which the fuel assembly is placed.

The pole 75 has a lower part 77 mounted telescopically by means of an axle 78 located inside apertures 79 on the tubular upper part of the pole. The part 77 has a plate 80, to which are fastened bearing struts 81 passing with play through the plates 72 and 73 in order to come to bear on the adaptor plate 10 of the assembly.

A jack 82 is fastened to the upper part of the pole 75 and has a rod connected by means of a fork 83 to the axle 78 of the telescopic lower part 77.

A second jack 84 is likewise fastened to the upper part of the pole and has a rod connected to the plate 72 for the movement of the stems 71 and to a guide sleeve 85 mounted slidably in the bore of the lower part of the pole 75.

Each of the twenty-four spindles of the fitting device illustrated in FIG. 12 can be equipped with a blocking sleeve by positioning the tool above a supply device, such as that shown in FIGS. 10 and 11. All the spindles of the multi-spindle device can be equipped in a single operation if the orifices for receiving the sleeves 25 on the supply device are placed in an arrangement reproducing the transverse arrangement of the guide tubes in an assembly. There can also be a supply device having several sets of orifices, each corresponding in terms of their positions on the plates 57, 58 and 60 to the transverse arrangement of the guide tubes in an assembly. The sleeves, by means of their upper end, come up against the adjusting ring 86 located in the upper part of the spindle 70.

The sleeves can be retained either by leaf springs fastened to the spindles or by retention claws, or by springs and claws.

If the spindles 70 have retention claws, these can be actuated as a whole by moving the plate 72 by means of the jack 84.

The device is lowered into the pool above the fuel assembly to be reinstalled and is then placed exactly in position so that each of the spindles 70 is in alignment with a guide tube 4. This exact positioning can be monitored by means of a video camera.

The spindles 70, on which the blocking sleeves 25 are engaged, are introduced into the corresponding tubes 4, and the sleeves 25 are put in place by pushing by means of the pole 75. The depth of insertion of the blocking sleeves is defined perfectly by means of the adjusting rings 86 which come to bear on the upper face of the adaptor plate 10, in order to bring the pole 75 into abutment when the sleeves are put in place.

If the device has retention claws, these are put into the retracted position by feeding the jack 84 in order to ensure the raising of the stems 71.

If the sleeves are retained solely by means of leaf springs, the spindles can be extracted without any prior operation.

The jack 82 is fed so as to exert a push on the lower part 77 of the pole which bears on the upper connector of the assembly. This causes the pole to rise as a result of reaction and the extraction of the spindles, the blocking sleeve remaining in position in the corresponding guide tubes.

If retention claws are used, the retraction of these claws makes it possible to do without the connection between the blocking sleeve and the corresponding spindle, and if springs are used the elasticity of these springs makes it possible to extract the spindle without moving the blocking sleeve.

FIG. 13 shows a device for the fitting of blocking sleeves of guide tubes of assemblies; this device has a simple structure, and its entirely manual functioning requires no external energy supply.

The device is shown during an operation of fitting a blocking sleeve 25 in a guide tube 4, inside the adaptor plate 10 of a fuel assembly.

The device consists of a tubular pole 90 whose upper part is suspended, by means of a lifting ring 91, on the winch of a travelling crane moving above the fuel pool in which the fuel assembly is stored.

The pole 90 has a lower connector of reduced diameter 92, which, at its end, carries a ring 93 for adjusting the depth of insertion.

A spindle 94 is mounted slidably in the bore of the connector 92 by means of a guide cylinder 95 mounted without play and with mild friction in the bore of the connector.

The lower part of spindle 94, below the cylinder 95, comprises an end part, the diameter of which is less than the inside diameter of a blocking sleeve 25. Fastened to this lower part of the spindle are three curved leaf springs 98 similar to the leaf springs 48 described and illustrated in FIGS. 9A, 9B and 9C.

The lower part of the spindle 94 has the form of a nose, making it easier to introduce the spindle at the moment of the fitting of a blocking sleeve 25 in a guide tube 4.

The upper part of the spindle above the cylinder 95 consists of a stem, the diameter of which is substantially less than the diameter of the bore of the connector 92 and whose upper part is fixed to a guide head 96 mounted with mild friction in a bore 97 within the part of large diameter of the pole 90.

The guide head 96 is connected to the control rod 99 of a movement device remotely actuated manually.

The device of the ball-type remote-control kind comprises a sheath 100 whose lower part is fastened, by means of nuts 101, to a stage 102 fixed to the pole 90. The sheath 100 is likewise fastened to the pole in its upper part by means of a bush unit 103. The control rod 99 is mounted slidably within the sheath 100 and, outside the sheath, has a lower part connected to the head 96.

The upper part of the rod 99 is connected to a control button 105 and to a control handle 106 with a micrometer screw. The button 105 and the handle 106 are mounted on the bush unit 103 at the upper end of the pole.

A push exerted on the button 105 ensures a movement of the rod 99 and of the spindle in the lowering direction over a distance at least equal to the length of the lower part of the spindle 94 below the cylinder 95. This movement makes it possible to cause the lower end of the spindle having the leaf springs 98 to change from a position retracted inside the connector 92 to a completely extracted position, as shown in FIG. 13. A movement in the opposite direction is obtained by pulling on the button 105.

The handle 106 makes it possible to obtain limited and controlled movements of the spindle 94 in either direction.

The use of the device illustrated in FIG. 13 for installing a blocking sleeve in a guide tube 4 of a fuel assembly, inside the adaptor plate 10 of the upper connector of the assembly, will now be described.

In a first step, the pole 90 is moved by means of the suspension winch, in such a way that its lower part is above a sleeve supply device, such as that shown in FIGS. 10 and 11, and is located in the vicinity of the connector of the assembly to be reinstalled. The spindle 94 is placed in its extracted position, as shown in FIG. 13. The spindle 94 is engaged into a blocking sleeve 25 arranged freely in the supply device, the plate 60 of which is in its released position. The sleeve is retained by the elastic leaf springs 98. The sleeve 25, in position on the spindle 94, comes up against the adjusting ring 93.

The pole is raised slightly to obtain the extraction of the sleeve and is then placed in axial alignment with the tube 4. The spindle 94 is introduced into the passage hole of the plate 10 and into the guide tube, a push being transmitted to the spindle 94 by means of the pole. The adjusting ring 93, coming up against the upper face of the adaptor plate 10 after the engagement of the sleeve, defines the final position of the spindle. The blocking sleeve is then perfectly in place in the tube and ensures that this tube 4 is blocked inside the plate 10. A pull is then exerted on the button 105, thus causing the spindle 94 to rise inside the connector 92, the projecting part having the springs 98 being retracted completely inside the bore of the connector 92. The blocking sleeve 25 experiences no movement during the raising of the spindle 94, being retained axially by the adjusting ring 93. Furthermore, the sleeve 25 is blocked inside the guide tube.

The movement device remotely controlled manually can also be used to introduce the blocking sleeve into the guide tube as a result of a downward movement controlled by a push exerted on the button 105. The spindle is moved downwards as a result of a push on the button 105, its lower part assuming its position projecting at the end of the connector 92. It is then possible, as before, to arrange a blocking sleeve on the end of the spindle 94, in order to carry out a new operation of fitting a sleeve in another guide tube of the assembly.

The advantage of the device illustrated in FIG. 13 is its very great simplicity as regards both its structure and its use. The device needs no drive means, such as jacks, requiring an external energy source.

The device for the fitting of blocking sleeves according to the invention makes it possible, under all circumstances, to carry out an insertion of the sleeve in a perfectly controlled position by means of simple operations, and then an extraction of the spindle which has effected the fitting of the sleeve, without movement of the latter inside the guide tube.

The use of a multi-spindle device makes it possible to carry out simultaneously the fitting of the twenty-four blocking sleeves of the guide tubes of a fuel assembly.

The devices for retaining the sleeve on the spindle may differ from those described and which are either of the completely passive type (leaf springs) or of the active type requiring a control means (retention claws). If passive means are used, the forces retaining the sleeve on the spindle must be much lower than the elastic forces ensuring the retention of the blocking sleeve in the guide tube, should the bearing stop formed by the adjusting ring be fixed to the pole and be lifted together with the latter during the extraction of the spindle, after the fitting of the sleeve.

Any number of springs may be used for retaining the sleeve on the spindle. It is possible, for example, to provide only a single spring, the retention of the sleeve being ensured by the return of this sleeve against the surface of the spindle along a generatrix.

It is also possible to use other means for extracting the spindle, and this extraction can be carried out either during the lifting of the pole as a whole or by controlling the movement of a vertically movable member from the upper surface of the pool.

Finally, the device according to the invention can be used for the fitting of blocking sleeves in the guide tubes of a fuel assembly of a water-cooled nuclear reactor of any type comprising a removable connector.

We claim:

1. Device for fitting a blocking sleeve of a guide tube in a removable connector of a fuel assembly of a water-cooled nuclear reactor, said fuel assembly, consisting of a bundle of parallel fuel rods held in a framework formed by guide tubes, spacers and upper and lower end connectors, being positioned underwater in a pool, each of said guide tubes in vertical position being removably connected to said upper end connector by means of a radially deformable end part of said guide tube seated in a hole passing through said upper connector and having a radially projecting retention part and an inner part receiving a blocking sleeve, in order to ensure radial expansion and retention of said guide tube via its retention part in an annular widening of said hole of said upper connector, said device comprising
    (a) a pole fastened in vertical position to a handling and lifting means arranged above said pool and having at least one lower end part comprising a spindle, said spindle having a diameter smaller than an inside diameter of said blocking sleeve;
    (b) means for retaining said blocking sleeve in position engaged on said spindle, said means comprising at least one leaf spring fastened to said spindle in its axial direction and having a convex curvature directed outwardly of said spindle, in such a way that a diameter of an imaginary cylinder coaxial with said spindle and enveloping said springs is greater than said inside diameter of said blocking sleeve;
    (c) a bearing surface transverse to an axis of said spindle and adapted to bear on part of said blocking sleeve in position engaged on said spindle; and
    (d) means for vertical movement of at least a part of said pole comprising said spindle.

2. Fitting device according to claim 1, wherein said means for retaining said blocking sleeve consists of three leaf springs fastened to a periphery of said spindle in positions located at 120° relative to one another about said axis of said spindle.

3. Fitting device according to claim 1, wherein said pole is slidably mounted inside a tubular body having means of bearing on an adaptor plate of said upper connector, said tubular body and said pole being connected by jack means to allow said spindle to be extracted from said blocking sleeve after fitting of said blocking sleeve, as a result of vertical upward movement of said pole, said tubular body bearing on said adaptor plate of said fuel assembly.

4. Fitting device according to claim 3, wherein said tubular body comes to bear on said adaptor plate by means of a unit for ejection of blocking sleeves.

5. Fitting device according to claim 3, wherein said tubular body comes to bear on said adaptor plate by means of an adjusting ring having a bearing surface for said blocking sleeve.

6. Device for fitting a blocking sleeve of a guide tube in a removable connector of a fuel assembly of a water-cooled nuclear reactor, said fuel assembly, consisting of a bundle of parallel fuel rods held in a framework formed by guide tubes, spacers and upper and lower end connectors, being positioned underwater in a pool, each of said guide tubes in vertical position being removably connected to said upper end connector by means of a radially deformable end part of said guide tube seated in a hole passing through said upper connector and having a radially projecting retention part and an inner part receiving a blocking sleeve, in order to ensure radial expansion and retention of said guide tube via its retention part in an annular widening of said hole by said upper connector, said device comprising
  (a) a pole fastened in vertical position to a handling and lifting means arranged above said pool;
  (b) a plate fixed to a lower end part of said pole carrying a set of spindles, each said spindle having a diameter smaller than an inside diameter of said blocking sleeve, means for retaining said blocking sleeve in position engaged on said spindle, said means comprising at least one convexly curved leaf spring fastened to a peripheral surface of said spindle, said spindles being fastened to said plate in positions corresponding to positions of said guide tubes of a fuel assembly;
  (c) each spindle comprising a bearing surface transverse to an axis of said spindle and coming to bear on part of a corresponding blocking sleeve in engaged position on said spindle; and
  (d) means for vertical movement of at least a part of said pole comprising said plate.

7. Fitting device according to claim 6, wherein said pole comprises first and second telescoping parts, said first telescoping part carrying a jack having a rod connected to said second telescoping part which comprises devices for bearing on said adaptor plate of the upper connector, an adaptor plate being fixed to said first telescoping part of said pole.

8. Fitting device according to claim 6, wherein said spindle is slidably mounted in a bore of a tubular connector forming said lower part of said pole and is connected to a device for remote-controlled axial movement.

9. Fitting device according to claim 8, wherein the device for axial movement consists of a manually operated device comprising a push-pull control rod.

10. Fitting device according to claim 6, comprising, immediately adjacent to the connector on which fitting of said sleeve is carried out, a device for supply of blocking sleeves.

11. Fitting device according to claim 10, wherein the supply device comprises
  (a) a horizontal first plate having a plurality of receptacles receiving ends of said sleeves;
  (b) a horizontal second plate located above said first plate at a predetermined spacing and having a plurality of passage orifices whose diameter is greater than a diameter of said sleeves and which are arranged in alignment with receptacles of said plate;
  (c) a third plate movably mounted in a horizontal plane between said first and second plates and having a plurality of passage orifices in an arrangement identical to that of said passage orifices of said second plate; and
  (d) means for movement of said third plate relative to said first and second plates between a position of alignment of said orifices and of said receptacles and an offset position allowing retention of sleeves placed in said supply device.

12. Fitting device according to claim 11, wherein said orifices and said receptacles are respectively arranged on plates in an arrangement reproducing a transverse arrangement of said guide tubes of a said fuel assembly.

13. Fitting device according to claim 12, wherein said orifices and said receptacles are respectively arranged on plates in several sets, each reproducing a transverse arrangement of said guide tubes of said fuel assembly.

* * * * *